(12) United States Patent
Shiga et al.

(10) Patent No.: US 9,353,199 B2
(45) Date of Patent: *May 31, 2016

(54) GOLF BALL RESIN COMPOSITION AND GOLF BALL

(71) Applicant: DUNLOP SPORTS CO., LTD., Kobe-shi, Hyogo (JP)

(72) Inventors: Kazuyoshi Shiga, Kobe (JP); Ryo Murakami, Kobe (JP); Takahiro Shigemitsu, Kobe (JP)

(73) Assignee: DUNLOP SPORTS CO. LTD., Kobe-Shi (JP)

( * ) Notice: Subject to any disclaimer, the term of this patent is extended or adjusted under 35 U.S.C. 154(b) by 157 days.

This patent is subject to a terminal disclaimer.

(21) Appl. No.: 13/728,644

(22) Filed: Dec. 27, 2012

(65) Prior Publication Data

US 2013/0172110 A1  Jul. 4, 2013

(30) Foreign Application Priority Data

Dec. 28, 2011  (JP) .................................. 2011-289984

(51) Int. Cl.
*C08K 5/098* (2006.01)
*A63B 37/00* (2006.01)
*C08F 22/02* (2006.01)

(52) U.S. Cl.
CPC ............... *C08F 22/02* (2013.01); *A63B 37/006* (2013.01); *A63B 37/0051* (2013.01); *A63B 37/0054* (2013.01); *A63B 37/0059* (2013.01); *A63B 37/0073* (2013.01); *C08K 5/098* (2013.01)

(58) Field of Classification Search
None
See application file for complete search history.

(56) References Cited

U.S. PATENT DOCUMENTS

| | | | |
|---|---|---|---|
| 5,312,857 A | 5/1994 | Sullivan | |
| 6,100,321 A * | 8/2000 | Chen | 524/400 |
| 6,329,458 B1 | 12/2001 | Takesue et al. | |
| 6,953,820 B2 | 10/2005 | Statz et al. | |
| 7,803,861 B1 * | 9/2010 | Binette | 524/322 |
| 2002/0099120 A1 | 7/2002 | Takesue et al. | |
| 2002/0165038 A1 | 11/2002 | Abe | |
| 2003/0050373 A1 | 3/2003 | Chen | |
| 2005/0267240 A1 * | 12/2005 | Chen | 524/322 |
| 2008/0312007 A1 | 12/2008 | Rajagopalan et al. | |
| 2010/0160515 A1 | 6/2010 | Iizuka et al. | |
| 2010/0160519 A1 | 6/2010 | Iizuka et al. | |
| 2010/0216571 A1 | 8/2010 | Umezawa et al. | |
| 2010/0216572 A1 | 8/2010 | Umezawa et al. | |
| 2010/0216574 A1 | 8/2010 | Umezawa et al. | |
| 2010/0311884 A1 | 12/2010 | Iizuka et al. | |
| 2011/0092312 A1 | 4/2011 | Shigemitsu | |
| 2011/0118398 A1 | 5/2011 | Iizuka et al. | |
| 2013/0053176 A1 | 2/2013 | Shiga et al. | |
| 2013/0053184 A1 | 2/2013 | Shiga et al. | |
| 2013/0172109 A1 * | 7/2013 | Shiga et al. | 473/372 |
| 2013/0172110 A1 | 7/2013 | Shiga et al. | |
| 2013/0172114 A1 * | 7/2013 | Shigemitsu | 473/373 |
| 2013/0172115 A1 * | 7/2013 | Shigemitsu | 473/373 |
| 2013/0172116 A1 * | 7/2013 | Shigemitsu | 473/373 |

FOREIGN PATENT DOCUMENTS

| | | |
|---|---|---|
| JP | 4-208246 A | 7/1992 |
| JP | 7-292068 A | 11/1995 |
| JP | 2002-157646 A | 6/2000 |
| JP | 2002-177417 A | 6/2002 |
| JP | 2002-219195 A | 8/2002 |
| JP | 2004-524418 A | 8/2004 |
| JP | 2010-142640 A | 7/2010 |
| JP | 2010-194313 A | 9/2010 |
| JP | 2010-194314 A | 9/2010 |
| JP | 2010-194315 A | 9/2010 |
| JP | 2011-101788 A | 5/2011 |
| JP | 2011-104365 A | 6/2011 |
| WO | WO 02/079319 A2 | 10/2002 |

OTHER PUBLICATIONS

U.S. Office Action, dated Feb. 11, 2014, for U.S. Appl. No. 13/303,284.
U.S. Final Office Action, issued Jul. 1, 2014, for U.S. Appl. No. 13/303,284.
English translation of Japanese Office Action, issued Sep. 1, 2015, for Japanese Application No. 2011-289984.
English Translation of Office Action issued in Chinese Patent Application No. 201210585399.5 dated Mar. 24, 2016.

* cited by examiner

*Primary Examiner* — David Buttner
(74) *Attorney, Agent, or Firm* — Birch, Stewart, Kolasch & Birch, LLP

(57) ABSTRACT

An object of the present invention is to provide a golf ball excellent in a shot feeling and resilience. The present invention provides a golf ball resin composition comprising (A) at least one resin component selected from the group consisting of (a-1) a binary copolymer composed of an olefin and an $\alpha,\beta$-unsaturated carboxylic acid having 3 to 8 carbon atoms, (a-2) an ionomer resin consisting of a metal ion-neutralized product of the binary copolymer, (a-3) a ternary copolymer composed of the binary copolymer components and an $\alpha,\beta$-unsaturated carboxylic acid ester, and (a-4) an ionomer resin consisting of a metal ion-neutralized product of the ternary copolymer components; and (B) a basic metal salt of a fatty acid, and having a spin-lattice relaxation time (T1) of $^{13}C$ nucleus of 5.56 seconds or shorter measured by a High resolution solid state nuclear magnetic resonance (NMR) method.

20 Claims, 1 Drawing Sheet

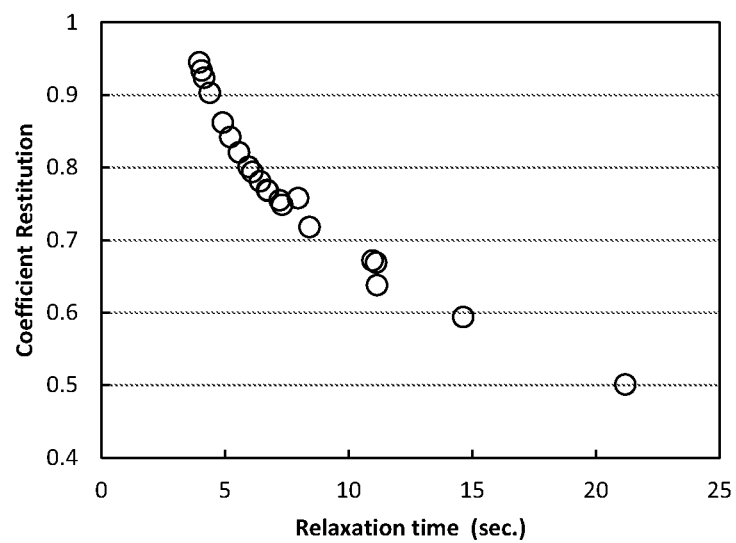

GOLF BALL RESIN COMPOSITION AND GOLF BALL

FIELD OF THE INVENTION

The present invention relates to a golf ball resin composition and a golf ball using the same.

DESCRIPTION OF THE RELATED ART

As a golf ball construction, a one-piece golf ball comprising a golf ball body, a two-piece golf ball comprising a core and a cover, a three-piece golf ball comprising a core consisting of a center and a single-layered intermediate layer covering the center, and a cover covering the core, and a multi-piece golf ball comprising a core consisting of a center and at least two intermediate layers covering the center, and a cover covering the core are known. Ionomer resins are used as materials constituting each layer of golf balls. Use of the ionomer resins as the constituent member of the golf ball provides the golf ball traveling a great distance, because of its high stiffness. Accordingly, ionomer resins are widely used as a material constituting a cover or an intermediate layer of the golf ball.

Japanese Patent Publication No. 2004-524418 A discloses a soft and resilient golf ball ethylene copolymer. The ethylene copolymer is a thermoplastic composition comprising E/X/Y copolymers (where E is ethylene, X is a $C_3$ to $C_8$ $\alpha,\beta$ ethylenically unsaturated carboxylic acid, and Y is a softening comonomer selected from alkyl acrylate and alkyl methacrylate wherein the alkyl groups have from 1 to 8 carbon atoms), wherein a. the E/X/Y copolymer has a melt index measured in accord with ASTM D-1238, condition E, at 190° C. using a 2160 gram weight of at least 75 grams per ten minutes, b. X is about 2 to 30 wt. % of the E/X/Y copolymer and Y being about 17 to 40 wt. % of the E/X/Y copolymer, and c. at least 55% of X is neutralized by one or more alkali metal, transition metal, or an alkaline earth metal cations.

Japanese Patent Publication No. 2002-219195 A discloses a golf ball material comprising a mixture which is composed of essential components: 100 parts by weight of a resin component consisting of a base resin and (e) a non-ionomer thermoplastic elastomer, the base resin and the elastomer being blended in a weight ratio of 100:0 to 50:50; (c) 5 to 80 parts by weight of a fatty acid and/or fatty acid derivative having a molecular weight of 280 to 1,500; and (d) 0.1 part to 10 parts by weight of a basic inorganic metal compound capable of neutralizing acidic groups left unneutralized in the base resin and component (c), wherein the base resin has (a) an olefin-unsaturated carboxylic acid binary random copolymer and/or a metal ion-neutralized olefin-unsaturated carboxylic acid binary random copolymer, blended with (b) an olefin-unsaturated carboxylic acid-unsaturated carboxylate ternary random copolymer and/or a metal ion neutralized olefin-unsaturated carboxylic acid-unsaturated carboxylate ternary random copolymer, in a weight ratio of 100:0 to 25:75.

Japanese Patent Publication No. 2011-101788 A discloses a golf ball resin composition comprising, 100 parts by mass of (A) an ionomer resin consisting of a metal ion-neutralized product of a ternary copolymer composed of ethylene, $\alpha,\beta$-unsaturated carboxylic acid having 3 to 8 carbon atoms and $\alpha,\beta$-unsaturated carboxylic acid ester, and from 25 parts to 100 parts by mass of (B) a metal salt of a fatty acid having 18 to 30 carbon atoms.

Japanese Patent Publication No. 2010-142640 A discloses a golf ball material made of a resin composition composed of (a) 100 parts by weight of an olefin-unsaturated carboxylic acid copolymer and/or an olefin-unsaturated carboxylic acid-unsaturated carboxylic acid ester copolymer having a weight-average molecular weight (Mw) of from about 120,000 to about 200,000 and a weight-average molecular weight (Mw) to number-average molecular weight (Mn) ratio of from about 3.0 to about 10.0, or a metal neutralization product thereof, (b) 75 to 200 parts by mass of an organic acid or a metal salt thereof, and (c) a basic inorganic metal compound; wherein component (c) is a component for neutralizing acid groups in components (a) and (b), and is included in an amount corresponding to from 30 to 130 mole % of the acid groups in components (a) and (b).

Japanese Patent Publication No. 2011-104365 A discloses a golf ball material which is a resin mixture composed of (a) a metal-neutralized polymer which is an olefin-unsaturated carboxylic acid copolymer and/or an olefin-unsaturated carboxylic acid-unsaturated carboxylic acid ester copolymer having a weight-average molecular weight (Mw) of from 40,000 to 200,000 and a weight-average molecular weight (Mw) to number-average molecular weight (Mn) ratio of from 3.5 to 8.5, wherein at least 30 mole % of acid groups on the copolymer are neutralized, (b) an organic acid or a metal salt thereof, and (c) a basic inorganic metal compound for neutralizing at least 70 mole % of acid groups in components (a) and (b), which resin mixture has a Shore D hardness of from 30 to 50.

SUMMARY OF THE INVENTION

Cured products of rubber compositions have been used for cores of golf balls. However, the cured products of the rubber compositions have a problem of not being recycled after molding the core since the cured products of the rubber compositions have no thermoplasticity. Although molding cores from thermoplastic resins capable of injection molding has been studied, a soft material with an excellent resilience like the cured product of the rubber composition has not been obtained.

The present invention has been achieved in view of the above circumstances. An object of the present invention is to provide a golf ball resin composition capable of injection molding with an excellent resilience. Another object of the present invention is to provide a golf ball with an excellent shot feeling and resilience.

The present invention provides a golf ball resin composition comprising (A) at least one resin component selected from the group consisting of (a-1) a binary copolymer composed of an olefin and an $\alpha,\beta$-unsaturated carboxylic acid having 3 to 8 carbon atoms, (a-2) an ionomer resin consisting of a metal ion-neutralized product of a binary copolymer composed of an olefin and an $\alpha,\beta$-unsaturated carboxylic acid having 3 to 8 carbon atoms, (a-3) a ternary copolymer composed of an olefin, an $\alpha,\beta$-unsaturated carboxylic acid having 3 to 8 carbon atoms and an $\alpha,\beta$-unsaturated carboxylic acid ester, and (a-4) an ionomer resin consisting of a metal ion-neutralized product of a ternary copolymer composed of an olefin, an $\alpha,\beta$-unsaturated carboxylic acid having 3 to 8 carbon atoms and an $\alpha,\beta$-unsaturated carboxylic acid ester; and (B) a basic metal salt of a fatty acid, and having a spin-lattice relaxation time (T1) of $^{13}C$ nucleus measured by a high resolution solid state nuclear magnetic resonance (NMR) method of 5.56 seconds or shorter.

The present invention provides a golf ball resin composition having a spin-lattice relaxation time (T1) of $^{13}C$ nucleus measured by a high resolution solid state nuclear magnetic resonance (NMR) method of 5.56 seconds or shorter. When the decay of the magnetization was measured by the spin-lattice relaxation time (T1) of $^{13}C$ nucleus measured by a high resolution solid state nuclear magnetic resonance (NMR) method on ionomer resins, the obtained relaxation time (T1) is thought to be caused by trans conformation of ethylene chains. The present inventors predicted that ethylene crystals and ethylene chain-constraining layers surrounding the ion association exist as a part where the trans conformation can possibly occur, and that a relaxation component in measurement of magnetization decay can be separated into a short-time component and a long-time component. Then, the present inventors have found that the ethylene chain-constraining layers correlate with resilience. More specifically, when the relaxation time (T1) becomes shorter, the mobility of the ethylene chain-constraining layers becomes higher and the resilience improves. Since the golf ball resin composition has a spin-lattice relaxation time (T1) of $^{13}C$ nucleus measured by a high resolution solid state carbon nuclear magnetic resonance (NMR) method of 5.56 seconds or shorter, the mobility of the ethylene chain-constraining layer becomes higher and the resilience is improved. The golf ball having a constituent member formed form such a golf ball resin composition is excellent in the resilience and shot feeling.

The present invention provides a golf ball resin composition comprising (A) at least one resin component selected from the group consisting of (a-1) a binary copolymer composed of an olefin and an α,β-unsaturated carboxylic acid having 3 to 8 carbon atoms, (a-2) an ionomer resin consisting of a metal ion-neutralized product of a binary copolymer composed of an olefin and an α,β-unsaturated carboxylic acid having 3 to 8 carbon atoms, (a-3) a ternary copolymer composed of an olefin, an α,β-unsaturated carboxylic acid having 3 to 8 carbon atoms and an α,β-unsaturated carboxylic acid ester, and (a-4) an ionomer resin consisting of a metal ion-neutralized product of a ternary copolymer composed of an olefin, an α,β-unsaturated carboxylic acid having 3 to 8 carbon atoms and an α,β-unsaturated carboxylic acid ester; and (B) a basic metal salt of a fatty acid. The golf ball resin composition of the present invention containing (A) the resin component and (B) the basic metal salt of the fatty acid is capable of injection molding and recycling.

According to the present invention, the golf ball resin composition capable of injection molding and recycling with an excellent resilience is obtained. The golf ball using the golf ball resin composition of the present invention provides an excellent shot feeling and resilience.

BRIEF DESCRIPTION OF THE DRAWINGS

FIG. 1 is a graph showing a relation between coefficient of restitution and the relaxation time (T1).

DESCRIPTION OF THE PREFERRED EMBODIMENT

The present invention provides a golf ball resin composition comprising (A) at least one resin component selected from the group consisting of (a-1) a binary copolymer composed of an olefin and an α,β-unsaturated carboxylic acid having 3 to 8 carbon atoms, (a-2) an ionomer resin consisting of a metal ion-neutralized product of a binary copolymer composed of an olefin and an α,β-unsaturated carboxylic acid having 3 to 8 carbon atoms, (a-3) a ternary copolymer composed of an olefin, an α,β-unsaturated carboxylic acid having 3 to 8 carbon atoms and an α,β-unsaturated carboxylic acid ester, and (a-4) an ionomer resin consisting of a metal ion-neutralized product of a ternary copolymer composed of an olefin, an α,β-unsaturated carboxylic acid having 3 to 8 carbon atoms and an α,β-unsaturated carboxylic acid ester; and (B) a basic metal salt of a fatty acid, and having a spin-lattice relaxation time (T1) of $^{13}C$ nucleus measured by a high resolution solid state nuclear magnetic resonance (NMR) method of 5.56 seconds or shorter.

If the relaxation time (T1) is 5.56 seconds or shorter, a golf ball resin composition having high resilience is obtained. The relaxation time (T1) is preferably 5.05 or shorter. There is no lower limit on the relaxation time (T1), but the lower limit of the relaxation time (T1) is preferably 0.001 second, more preferably 0.002 second. The relaxation time (T1) is measured by the method described later. The relaxation time (T1) is controlled by choosing appropriately the kinds, contents, or the like of (A) resin component and (B) the basic metal salt of the fatty acid.

The golf ball resin composition of the present invention contains (A) at least one resin component selected from the group consisting of (a-1) the binary copolymer composed of an olefin and an α,β-unsaturated carboxylic acid having 3 to 8 carbon atoms; (a-2) the ionomer resin consisting of a metal ion-neutralized product of a binary copolymer composed of an olefin and an α,β-unsaturated carboxylic acid having 3 to 8 carbon atoms; (a-3) a ternary copolymer composed of an olefin, an α,β-unsaturated carboxylic acid having 3 to 8 carbon atoms, and an α,β-unsaturated carboxylic acid ester; and (a-4) an ionomer resin consisting a metal ion-neutralized product of a ternary copolymer composed of an olefin, an α,β-unsaturated carboxylic acid having 3 to 8 carbon atoms, and an α,β-unsaturated carboxylic acid ester, and (B) the basic metal salt of the fatty acid.

First, (A) at least one resin component selected from the group consisting of (a-1) the binary copolymer composed of an olefin and an α,β-unsaturated carboxylic acid having 3 to 8 carbon atoms; (a-2) the ionomer resin consisting of a metal ion-neutralized product of a binary copolymer composed of an olefin and an α,β-unsaturated carboxylic acid having 3 to 8 carbon atoms; (a-3) the ternary copolymer composed of an olefin, an α,β-unsaturated carboxylic acid having 3 to 8 carbon atoms, and an α,β-unsaturated carboxylic acid ester; and (a-4) the ionomer resin consisting of a metal ion-neutralized product of a ternary copolymer composed of an olefin, an α,β-unsaturated carboxylic acid having 3 to 8 carbon atoms, and an α,β-unsaturated carboxylic acid ester will be explained.

(a-1) component is a nonionic binary copolymer composed of an olefin and an α,β-unsaturated carboxylic acid having 3 to 8 carbon atoms wherein the carboxyl groups thereof are not neutralized. Further, (a-2) component includes an ionomer resin prepared by neutralizing at least a part of carboxyl groups in the binary copolymer composed of an olefin and α,β-unsaturated carboxylic acid having 3 to 8 carbon atoms with a metal ion.

(a-3) component is a nonionic ternary copolymer composed of an olefin, an α,β-unsaturated carboxylic acid having 3 to 8 carbon atoms, and an α,β-unsaturated carboxylic acid ester wherein the carboxyl groups thereof are not neutralized. (a-4) component includes an ionomer resin prepared by neutralizing at least a part of carboxyl groups in the ternary copolymer composed of an olefin and α,β-unsaturated carboxylic acid having 3 to 8 carbon atoms, and an α,β-unsaturated carboxylic acid ester with a metal ion.

In the present invention, "(a-1) the binary copolymer composed of an olefin and an α,β-unsaturated carboxylic acid having 3 to 8 carbon atoms" is sometimes merely referred to as "binary copolymer". "(a-2) The ionomer resin consisting of a metal ion-neutralized product of a binary copolymer composed of an olefin and an α,β-unsaturated carboxylic acid having 3 to 8 carbon atoms" is sometimes referred to as "the binary ionomer resin". "(a-3) The ternary copolymer composed of an olefin, an α,β-unsaturated carboxylic acid having 3 to 8 carbon atoms, and an α,β-unsaturated carboxylic acid ester" is sometimes merely referred to as "ternary copolymer". "(a-4) The ionomer resin consisting of a metal ion-neutralized product of a ternary copolymer composed of an olefin, an α,β-unsaturated carboxylic acid having 3 to 8 carbon atoms, and an α,β-unsaturated carboxylic acid ester" is sometimes referred to as "the ternary ionomer resin".

The olefin preferably includes an olefin having 2 to 8 carbon atoms. Examples of the olefin are ethylene, propylene, butene, pentene, hexene, heptene, and octene. The olefin more preferably includes ethylene. Examples of the α,β-unsaturated carboxylic acid having 3 to 8 carbon atoms are acrylic acid, methacrylic acid, fumaric acid, maleic acid and crotonic acid. Among these, acrylic acid and methacrylic acid are particularly preferred. Examples of the α,β-unsaturated carboxylic acid ester include methyl ester, ethyl ester, propyl ester, n-butyl ester, isobutyl ester of acrylic acid, methacrylic acid, fumaric acid, maleic acid or the like. In particular, acrylic acid ester and methacrylic acid ester are preferable.

(a-1) The binary copolymer preferably includes a binary copolymer composed of ethylene and (meth)acrylic acid. (a-2) The binary ionomer resin preferably includes the metal ion-neutralized product of the binary copolymer composed of ethylene-(meth)acrylic acid. (a-3) The ternary copolymer preferably includes a ternary copolymer composed of ethylene, (meth)acrylic acid, and (meth)acrylic acid ester. (a-4) The ternary ionomer resin preferably includes the metal ion-neutralized product of the ternary copolymer composed of ethylene, (meth)acrylic acid, and (meth)acrylic acid ester. Here, (meth) acrylic acid means acrylic acid and/or methacrylic acid.

The content of the α,β-unsaturated carboxylic acid component having 3 to 8 carbon atoms in (a-1) the binary copolymer or (a-3) the ternary copolymer is preferably 4 mass % or more, more preferably 5 mass % or more, and is preferably 30 mass % or less, more preferably 25 mass % or less.

The melt flow rate (190° C., 2.16 kg) of (a-1) the binary copolymer or (a-3) the ternary copolymer is preferably 5 g/10 min or more, more preferably 10 g/10 min or more, and even more preferably 15 g/10 min or more, and is preferably 1,700 g/10 min or less, more preferably 1,500 g/10 min or less, even more preferably 1,300 g/10 min or less. If the melt flow rate (190° C., 2.16 kg) of (a-1) the binary copolymer or (a-3) the ternary copolymer is 5 g/10 min or more, the golf ball resin composition has better fluidity, and thus it is easier to mold a constituent member. If the melt flow rate (190° C., 2.16 kg) of (a-1) the binary copolymer or (a-3) the ternary copolymer is 1,700 g/10 min or less, the resultant golf ball has better durability.

Specific examples of (a-1) the binary copolymer include an ethylene-methacrylic acid copolymer such as "NUCREL (registered trademark) (e.g. NUCREL N1050H, NUCREL N2050H, NUCREL N1110H, NUCREL N0200H) manufactured by Du Pont-Mitsui Polychemicals Co, and an ethylene-acrylic acid copolymer such as "PRIMACORE (registered trademark) 59801" available from Dow Chemical Company.

Specific examples of (a-3) the ternary copolymer include "NUCREL (registered trademark) (e.g. NUCREL AN4318, NUCREL AN4319) manufactured by Du Pont-Mitsui Polychemicals Co, and "NUCREL (registered trademark) (e.g. NUCREL AE) manufactured by E.I. du Pont de Nemours and Company, and "PRIMACORE (registered trademark) (e.g. PRIMCOR AT310, PRIMCOR AT320) available from Dow Chemical Company. (a-1) The binary copolymer or (a-3) the ternary copolymer may be used alone or as a mixture of at least two of them.

The content of the α,β-unsaturated carboxylic acid having 3 to 8 carbon atoms of (a-2) the binary ionomer resin is preferably 15 mass % or more, more preferably 16 mass % or more, and even more preferably 17 mass % or more, and is preferably 30 mass % or less, more preferably 25 mass % or less. If the content of the α,β-unsaturated carboxylic acid having 3 to 8 carbon atoms is 15 mass % or more, the resultant constituent member has a desirable hardness. If the content of the α,β-unsaturated carboxylic acid having 3 to 8 carbon atoms is 30 mass % or less, since the hardness of the resultant constituent member does not become excessively high, the durability and shot feeling become better.

The degree of neutralization of the carboxyl groups contained in (a-2) the binary ionomer resin is preferably 15 mole % or more, more preferably 20 mole % or more, and is preferably 90 mole % or less, more preferably 85 mole % or less. If the degree of neutralization is 15 mole % or more, the resultant golf ball has better resilience and durability. On the other hand, if the degree of neutralization is 90 mole % or less, the golf ball resin composition has better fluidity (good moldability). The degree of neutralization of the carboxyl groups of (a-2) the binary ionomer resin can be calculated by the following expression.

Degree of neutralization (mole %) of the binary ionomer resin=(the number of moles of carboxyl groups neutralized in the binary ionomer resin/the number of moles of all carboxyl groups contained in the binary ionomer resin)×100

Examples of a metal ion used for neutralizing at least a part of carboxyl groups of (a-2) the binary ionomer resin include: monovalent metal ions such as sodium, potassium, lithium, or the like; divalent metals ions such as magnesium, calcium, zinc, barium, cadmium, or the like; trivalent metals ions such as aluminum or the like; and other metals ions such as tin, zirconium, or the like.

Specific examples of (a-2) the binary ionomer resin include trade name "Himilan (registered trademark) (e.g. Himilan 1555 (Na), Himilan 1557 (Zn), Himilan 1605 (Na), Himilan 1706 (Zn), Himilan 1707 (Na), Himilan AM7311 (Mg), Himilan AM7329 (Zn))" commercially available from Du Pont-Mitsui Polychemicals Co., Ltd.

Further, examples include "Surlyn (registered trademark) (e.g. Surlyn 8945 (Na), Surlyn 9945 (Zn), Surlyn 8140 (Na), Surlyn 8150 (Na), Surlyn 9120 (Zn), Surlyn 9150 (Zn), Surlyn 6910 (Mg), Surlyn 6120 (Mg), Surlyn 7930 (Li), Surlyn 7940 (Li), Surlyn AD8546 (Li))" commercially available from E.I. du Pont de Nemours and Company.

Further, examples include "Iotek (registered trademark) (e.g. Iotek 8000 (Na), Iotek 8030 (Na), Iotek 7010 (Zn), Iotek 7030 (Zn))" commercially available from ExxonMobil Chemical Corporation.

(a-2) The binary ionomer resins may be used alone or as a mixture of at least two of them. It is noted that Na, Zn, Li, and Mg described in the parentheses after the trade names indicate metal types of neutralizing metal ions of the binary ionomer resins.

(a-2) The binary ionomer resin preferably has a bending stiffness of 140 MPa or more, more preferably 150 MPa or more, and even more preferably 160 MPa or more, and preferably has a bending stiffness of 550 MPa or less, more preferably 500 MPa or less, even more preferably 450 MPa or less. If the bending stiffness of (a-2) the binary ionomer resin is too low, the flight distance tends to be shorter because of the increased spin rate of the golf ball. If the bending stiffness is too high, the durability of the golf ball may be lowered.

(a-2) The binary ionomer resin preferably has the melt flow rate (190° C., 2.16 kg) of 0.1 g/10 min or more, more preferably 0.5 g/10 min or more, and even more preferably 1.0 g/10 min or more, and preferably has the melt flow rate (190° C., 2.16 kg) of 30 g/10 min or less, more preferably 20 g/10 min or less, and even more preferably 15 g/10 min or less. If the melt flow rate of (a-2) the binary ionomer resin is 0.1 g/10 min or more, the golf ball resin composition has better fluidity and thus it is easy to mold the thin layer. If the melt flow rate of (a-2) the binary ionomer resin is 30 g/10 min or less, the durability of the resultant golf ball becomes better.

(a-2) The binary ionomer resin preferably has a slab hardness of 50 or more, more preferably 55 or more, even more preferably 60 or more, and preferably has a slab hardness of 75 or less, more preferably 73 or less, even more preferably 70 or less in Shore D hardness. If the binary ionomer resin has a slab hardness of 50 or more in Shore D hardness, the resultant constituent member has a high hardness. If the binary ionomer resin has a slab hardness of 75 or less in Shore D hardness, the resultant constituent member does not become excessively hard and thus the obtained golf ball has better durability.

The content of the $\alpha,\beta$-unsaturated carboxylic acid having 3 to 8 carbon atoms in (a-4) the ternary ionomer resin is preferably 2 mass % or more, more preferably 3 mass % or more, and is preferably 30 mass % or less, more preferably 25 mass % or less.

The degree of neutralization of the carboxyl groups contained in (a-4) the ternary ionomer resin is preferably 20 mole % or more, more preferably 30 mole % or more, and is preferably 90 mole % or less, more preferably 85 mole % or less. If the degree of neutralization is 20 mole % or more, the resultant golf ball obtained by using the golf ball resin composition of the present invention has better resilience and durability. If the degree of neutralization is 90 mole % or less, the golf ball resin composition has better fluidity (good moldability). The degree of neutralization of the carboxyl groups in the ionomer resin can be calculated by the following expression.

Degree of neutralization (mole %) of the ionomer resin=(the number of moles of carboxyl groups neutralized in the ionomer resin/the number of moles of all carboxyl groups contained in the ionomer resin)×100

Examples of a metal ion used for neutralizing at least a part of carboxyl groups of (a-4) the ternary ionomer resin include: monovalent metal ions such as sodium, potassium, lithium, or the like; divalent metals ions such as magnesium, calcium, zinc, barium, cadmium, or the like; trivalent metals ions such as aluminum or the like; and other metals ions such as tin, zirconium, or the like.

Specific examples of (a-4) the ternary ionomer resin include trade name "Himilan (registered trademark) (e.g. Himilan AM7327 (Zn), Himilan 1855 (Zn), Himilan 1856 (Na), Himilan AM7331 (Na), or the like)" commercially available from Du Pont-Mitsui Polychemicals Co., Ltd. Further, the ternary ionomer resins commercially available from E.I. du Pont de Nemours and Company include trade name "Surlyn (registered trademark) (e.g. Surlyn 6320 (Mg), Surlyn 8120 (Na), Surlyn 8320 (Na), Surlyn 9320 (Zn), Surlyn 9320W (Zn) or the like)". The ionomer resins commercially available from ExxonMobil Chemical Corporation include trade name "Iotek (registered trademark) (e.g. Iotek 7510 (Zn), Iotek 7520 (Zn) or the like)". It is noted that Na, Zn, and Mg described in the parentheses after the trade names indicate metal types of neutralizing metal ions. (a-4) The ternary ionomer resins may be used alone or as a mixture of at least two of them.

(a-4) The ternary ionomer resin preferably has a bending stiffness of 10 MPa or more, more preferably 11 MPa or more, even more preferably 12 MPa or more, and preferably has a bending stiffness of 100 MPa or less, more preferably 97 MPa or less, even more preferably 95 MPa or less. If the bending stiffness of (a-4) the ternary ionomer resin is too low, the flight distance tends to be shorter because of the increased spin rate of the golf ball. If the bending stiffness is too high, the durability of the golf ball may be lowered.

(a-4) The ternary ionomer resin preferably has the melt flow rate (190° C., 2.16 kg) of 0.1 g/10 min or more, more preferably 0.3 g/10 min or more, and even more preferably 0.5 g/10 min or more, and preferably has the melt flow rate (190° C., 2.16 kg) of 20 g/10 min or less, more preferably 15 g/10 min or less, even more preferably 10 g/10 min or less. If the melt flow rate (190° C., 2.16 kg) of (a-4) the ternary ionomer resin is 0.1 g/10 min or more, the golf ball resin composition has better fluidity and thus it is easy to mold a thin layer. If the melt flow rate (190° C., 2.16 kg) of (a-4) the ternary ionomer resin is 20 g/10 min or less, the durability of the resultant golf ball becomes better.

(a-4) The ternary ionomer resin preferably has a slab hardness of 20 or more, more preferably 25 or more, even more preferably 30 or more, and preferably has a slab hardness of 70 or less, more preferably 65 or less, even more preferably 60 or less in Shore D hardness. If the ternary ionomer resin has a slab hardness of 20 or more in Shore D hardness, the resultant constituent member does not become excessively soft and thus the golf ball has higher resilience. If the ternary ionomer resin has a slab hardness of 70 or less in Shore D hardness, the resultant constituent member does not become excessively hard and thus the golf ball has better durability.

As (A) the resin component, (a-1) the binary copolymer, (a-2) the binary ionomer resin, (a-3) the ternary copolymer, and (a-4) the ternary ionomer resin may be used alone or as a mixture of at least two of them. The golf ball resin composition of the present invention preferably includes (a-3) the ternary copolymer or (a-4) the ternary ionomer resin as (A) the resin component, because the resultant constituent member does not become excessively hard, and thus the golf ball has higher resilience.

The golf ball resin composition of the preset invention contains (A) the resin component and (B) the basic metal salt of the fatty acid. If the golf ball resin composition contains (B) the basic metal salt of the fatty acid, the unneutralized carboxylic groups in (A) the resin component can be neutralized, and thus the resilience improves. In the following, (B) the basic metal salt of the fatty acid will be explained.

(B) The basic metal salt of the fatty acid is obtained by a well-known producing method where a fatty acid is allowed to react with a metal oxide or metal hydroxide. A general metal salt of a fatty acid is obtained by a reaction of a fatty acid with a metal oxide or metal hydroxide in an amount of the reaction equivalent, whereas a basic metal salt of a fatty acid is obtained by adding a metal oxide or metal hydroxide in an excessive amount which is larger than the reaction equivalent to a fatty acid. The metal content, melting point or the like of the product are different from those of a general metal salt of a fatty acid.

As (B) the basic metal salt of the fatty acid, preferred is a basic metal salt of a fatty acid represented by the following general formula (1).

$$mM^1O.M^2(RCOO)_2 \qquad (1)$$

In formula (1), m represents the number of moles of metal oxides or metal hydroxides in the basic metal salt of the fatty acid. m preferably ranges from 0.1 to 2.0, and more preferably from 0.2 to 1.5. If m is less than 0.1, the resilience of the obtained resin composition may be lowered, while if m exceeds 2.0, the melting point of the basic metal salt of the fatty acid becomes too high and thus it may be difficult to disperse to the resin component. As $M^1$ and $M^2$, the group II or the group XII metals of the periodic table are preferred, respectively. $M^1$ and $M^2$ may be identical or different each other. Examples of the group II metals include beryllium, magnesium, calcium, strontium and barium. Examples of the group XII metals include zinc, cadmium and mercury. Preferred is, for example, magnesium, calcium, barium or zinc, and more preferred is magnesium, as $M^1$ and $M^2$ metals.

In formula (1), RCOO means the residue of the saturated fatty acid or unsaturated fatty acid. Specific examples of the saturated fatty acid component of (B) the basic metal salt of the fatty acid (IUPAC name) include butanoic acid (C4), pentanoic acid (C5), hexanoic acid (C6), heptanoic acid (C7), octanoic acid (C8), nonanoic acid (C9), decanoic acid (C10), undecanoic acid (C11), dodecanoic acid (C12), tridecanoic acid (C13), tetradecanoic acid (C14), pentadecanoic acid (C15), hexadecanoic acid (C16), heptadecanoic acid (C17), octadecanoic acid (C18), nonadecanoic acid (C19), icosanoic acid (C20), henicosanoic acid (C21), docosanoic acid (C22), tricosanoic acid (C23), tetracosanoic acid (C24), pentacosanoic acid (C25), hexacosanoic acid (C26), heptacosanoic acid (C27), octacosanoic acid (C28), nonacosanoic acid (C29), and triacontanoic acid (C30).

Specific examples of the unsaturated fatty acid component of (B) the basic metal salt of the fatty acid (IUPAC name) include butenoic acid (C4), pentenoic acid (C5), hexenoic acid (C6), heptenoic acid (C7), octenoic acid (C8), nonenoic acid (C9), decenoic acid (C10), undecenoic acid (C11), dodecenoic acid (C12), tridecenoic acid (C13), tetradecenoic acid (C14), pentadecenoic acid (C15), hexadecenoic acid (C16), heptadecenoic acid (C17), octadecenoic acid (C18), nonadecenoic acid (C19), icosenoic acid (C20), henicosenoic acid (C21), docosenoic acid (C22), tricosenoic acid (C23), tetracosenoic acid (C24), pentacosenoic acid (C25), hexacosenoic acid (C26), heptacosenoic acid (C27), octacosenoic acid (C28), nonacosenoic acid (C29), and triacontenoic acid (C30).

Specific examples of the fatty acid component of (B) the basic metal salt of the fatty acid (Common name) are, for example, butyric acid (C4), valeric acid (C5), caproic acid (C6), enanthic acid (C7), caprylic acid (C8), pelargonic acid (C9), capric acid (C10), lauric acid (C12), myristic acid (C14), myristoleic acid (C14), pentadecylic acid (C15), palmitic acid (C16), palmitoleic acid (C16), margaric acid (C17), stearic acid (C18), elaidic acid (C18), vaccenic acid (C18), oleic acid (C18), linoleic acid (C18), linolenic acid (C18), 12-hydroxy stearic acid (C18), arachidic acid (C20), gadoleic acid (C20), arachidonic acid (C20), eicosenoic acid (C20), behenic acid (C22), erucic acid (C22), lignoceric acid (C24), nervonic acid (C24), cerotic acid (C26), montanic acid (C28), and melissic acid (C30).

(B) The basic metal salt of the fatty acid is preferably a basic metal salt of an unsaturated fatty acid. As (B) the basic metal salt of the fatty acid, preferred is at least one selected from the group consisting of oleic acid (C18), erucic acid (C22), linoleic acid (C18), linolenic acid (C18), arachidonic acid (C20), eicosapentaenoic acid (C20), docosahexaenoic acid (C22), stearidonic acid (C18), nervonic acid (C24), vaccenic acid (C18), gadoleic acid (C20), elaidic acid (C18), eicosenoic acid (C20), eicosadienoic acid (C20), docosadienoic acid (C22), pinolenic acid (C18), eleostearic acid (C18), mead acid (C20), adrenic acid (C22), clupanodonic acid (C22), nishinic acid (C24), and tetracosapentaenoic acid (C24).

(B) The basic metal salt of the fatty acid is preferably a basic metal salt of a fatty acid having 8 to 30 carbon atoms, and more preferably a basic metal salt of a fatty acid having 12 to 24 carbon atoms. Specific examples of (B) the basic metal salt of the fatty acid include basic magnesium laurate, basic calcium laurate, basic zinc laurate, basic magnesium myristate, basic calcium myristate, basic zinc myristate, basic magnesium palmitate, basic calcium palmitate, basic zinc palmitate, basic magnesium oleate, basic calcium oleate, basic zinc oleate, basic magnesium stearate, basic calcium stearate, basic zinc stearate, basic magnesium 12-hydroxystearate, basic calcium 12-hydroxystearate, basic zinc 12-hydroxystearate, basic magnesium behenate, basic calcium behenate, and basic zinc behenate. (B) The basic metal salt of the fatty acid preferably includes basic fatty acid magnesium, and more preferably basic magnesium stearate, basic magnesium behenate, basic magnesium laurate, and basic magnesium oleate. (B) The basic metal salt of the fatty acid may be used alone or as a mixture of at least two of them.

There is no particular limitation on the melting point of (B) the basic metal salt of the fatty acid, but if the metal is magnesium, the melting point is preferably 100° C. or more, and is preferably 300° C. or less, more preferably 290° C. or less, even more preferably 280° C. or less. If the melting point falls within the above range, the dispersibility to the resin component becomes better.

(B) The basic metal salt of the fatty acid preferably contains the metal component in an amount of 1 mole % or more, more preferably 1.1 more % or more, and preferably contains the metal component in an amount of 2 mole % or less, more preferably 1.9 mole % or less. If the content of the metal component falls within the range, the resilience of the obtained golf ball further improves. The content of the metal component of (B) the basic metal salt of the fatty acid is the numerical value calculated by dividing the metal amount (g) contained per 1 mole of the metal salt by the atomic weight of the metal, and is expressed in mole %.

A center composition used in the present invention preferably contains (B) the basic metal salt of the fatty acid in an amount of 25 parts by mass or more, more preferably 33 parts by mass or more, even more preferably 50 parts by mass or more, and preferably contains (B) the basic metal salt of the fatty acid in an amount of 100 parts by mass or less, with respect to 100 parts by mass of (A) the resin component. If the content of (B) the basic metal salt of the fatty acid is 25 parts by mass or more, the resilience of the golf ball improves, while if the content is 100 parts by mass or less, it is possible to suppress the lowering of the durability of the golf ball due to the increase in the low-molecular weight component.

The golf ball resin composition of the present invention preferably contains only (A) the resin component as the resin component; however, the golf ball resin composition may contain a thermoplastic elastomer or a thermoplastic resin, as long as they do not impair the effect of the present invention. If the golf ball resin composition contains a thermoplastic elastomer or a thermoplastic resin, the content of (A) the resin component in the resin component is preferably 50 mass % or more, more preferably 60 mass % or more, and even more preferably 70 mass % or more.

Examples of other thermoplastic elastomers are a thermoplastic polyamide elastomer having a commercial name of "Pebax (e.g. "Pebax 2533")" commercially available from Arkema K. K.; a thermoplastic polyurethane elastomer having a commercial name of "Elastollan (e.g. "Elastollan XNY85A")" commercially available from BASF Japan Ltd; a thermoplastic polyester elastomer having a commercial name of "Hytrel (e.g. "Hytrel 3548", "Hytrel 4047")" commercially available from Du Pont-Toray Co., Ltd.; a thermoplastic styrene elastomer having a commercial name of "Rabalon (e.g. "Rabalon T3221C")" commercially available from Mitsubishi Chemical Corporation; and the like.

In the present invention, the golf ball resin composition may further contain a pigment component such as a white pigment (for example, titanium oxide) and a blue pigment, a weight adjusting agent, a dispersant, an antioxidant, an ultraviolet absorber, a light stabilizer, a fluorescent material, a fluorescent brightener, and the like, as long as they do not impair the effect of the present invention.

The content of the white pigment (for example, titanium oxide) is preferably 0.5 part or more, more preferably 1 part or more, and the content of the white pigment is preferably 10 parts or less, more preferably 8 parts or less, with respect to 100 parts of the resin component by mass. If the amount of the white pigment is 0.5 part by mass or more, it is possible to impart the opacity to the resultant golf ball constituent member. Further, if the amount of the white pigment is more than 10 parts by mass, the durability of the resultant golf ball may deteriorate.

The golf ball resin composition of the present invention can be obtained, for example, by dry blending (A) component and (B) component. Further, the dry blended mixture may be extruded into the form of pellet. The dry blending may be carried out using, for example, a mixer capable of blending raw materials in the form of pellet, more preferably a tumbler type mixer. Extruding can be carried out by publicly known extruders such as a single-screw kneading extruder, a twin-screw kneading extruder, and a twin-single kneading extruder.

The golf ball resin composition of the present invention preferably has a hardness of 20 or larger, more preferably 25 or larger, and even more preferably 30 or larger in shore D hardness, and the golf ball resin composition preferably has a hardness of 65 or smaller, more preferably 60 or smaller, and even preferably 56 or smaller in shore D hardness. Use of the golf ball resin composition having a hardness of 20 or larger in shore D hardness provides the golf ball excellent in the resilience (flying distance). On the other hand, use of the golf ball resin composition having a hardness of 65 or smaller in shore D hardness provides the golf ball excellent in the shot feeling. Here, a hardness of the golf ball resin composition is a slab hardness of the golf ball resin composition that is molded into a sheet form. The method for the measurement is described later.

The golf ball resin composition of the present invention preferably has the melt flow rate (190° C., 2.16 kg) of 0.01 g/10 min or more, more preferably 0.05 g/10 min or more, and even more preferably 0.1 g/10 min or more, and preferably has the melt flow rate (190° C., 2.16 kg) of 100 g/10 min or less, more preferably 80 g/10 min or less, and even more preferably 50 g/10 min or less. If the golf ball resin composition has the melt flow rate in the above range, the moldability into the golf ball constituent member is good.

The golf ball resin composition preferably has a bending stiffness of 10 MPa or more, more preferably 15 MPa or more, even more preferably 20 MPa or more, and preferably has a bending stiffness of 450 MPa or less, more preferably 400 MPa or less, even more preferably 350 MPa or less. Use of the golf ball resin composition having a bending stiffness of 10 MPa or more provides the golf ball excellent in the resilience (flying distance). On the other hand, if the bending stiffness is 450 MPa or less, the obtained golf ball becomes appropriately soft and thus the shot feeling becomes good.

The golf ball resin composition of the present invention preferably has a rebound resilience of 40% or more, more preferably 43% or more, even more preferably 46% or more. Use of the golf ball resin composition having a rebound resilience of 40% or more provides the golf ball excellent in the resilience (flying distance). Here, the bending stiffness and the rebound resilience of the golf ball resin composition are measured by molding the golf ball resin composition into a sheet form. The methods for the measurement are described later.

The golf ball of the present invention is not limited, as long as it comprises a constituent member formed from the golf ball resin composition of the present invention. For example, in a one-piece golf ball, in a two-piece golf ball comprising a single-layered core and a cover disposed around the core, in a three-piece golf ball comprising a core having a center and a single-layered intermediate layer disposed around the center, and a cover disposed around the core, and in a multi-piece golf ball comprising a core having a center and at least one intermediate layer disposed around the center, and a cover disposed around the core (including the three-piece golf ball mentioned above), any one of constituent members is formed from the above golf ball resin composition. In one preferable embodiment, the golf ball comprises a core composed of at least one layer and a cover disposed around the core, wherein at least one layer of the core is formed from the golf ball resin composition of the present invention. In another preferable embodiment, the golf ball body of the one-piece golf ball is formed from the golf ball resin composition of the present invention. In particular, in one more preferable embodiment, the two-piece golf ball comprises a single-layered core and a cover disposed around the core, wherein the single-layered core is formed from the golf ball resin composition of the present invention. Also, in another more preferable embodiment, the multi-piece golf ball comprises a core having a center and at least one intermediate layer disposed around the center, and a cover disposed around the core, wherein the center is formed from the golf ball resin composition of the present invention.

In the following, the present invention will be explained based on the two-piece golf ball that comprises a core and a cover disposed around the core, wherein the core is formed from the golf ball resin composition of the present invention. However, the present invention is not limited to this embodiment.

The core, for example, is molded by injection molding the golf ball resin composition of the present invention. Specifically, it is preferred that the golf ball resin composition heated and melted at the temperature ranging from 160° C. to 260° C. is charged into a mold held under the pressure of 1 MPa to 100 MPa for 1 second to 100 seconds, and after cooling for 30 seconds to 300 seconds, the mold is opened.

The core preferably has a spherical shape. If the core does not have a spherical shape, the cover does not have a uniform thickness. As a result, there exist some portions where the performance of the cover is lowered.

The core preferably has the diameter of 39.00 mm or more, more preferably 39.25 mm or more, and even more preferably 39.50 mm or more, and preferably has the diameter of 42.37 mm or less, more preferably 42.22 mm or less, and even more preferably 42.07 mm or less. If the core has the diameter of 39.00 mm or more, the thickness of the cover does not become too thick and thus the resilience becomes better. On the other hand, if the core has the diameter of 42.37 mm or less, the thickness of the cover does not become too thin, and hence a protection ability of the cover is sufficiently provided.

When the core has a diameter from 39.00 mm to 42.37 mm, a compression deformation amount (shrinking deformation amount of the core along the compression direction) of the core when applying a load from 98 N as an initial load to 1275 N as a final load is preferably 1.00 mm or more, more preferably 1.10 mm or more, and is preferably 5.00 mm or less, more preferably 4.90 mm or less, even more preferably 4.80 mm or less. If the compression deformation amount is 1.00 mm or more, the shot feeling of the golf ball becomes better. If the compression deformation amount is 5.00 mm or less, the resilience of the golf ball becomes better.

The surface hardness of the core is 20 or larger, more preferably 25 or larger, and even more preferably 30 or larger in shore D hardness, and is preferably 70 or smaller, more preferably 69 or smaller in shore D hardness. If the surface hardness is 20 or larger in shore D hardness, the core does not become so soft and the better resilience of the golf ball is obtained. If the surface hardness of the core is 70 or smaller in shore D hardness, the core does not become so hard and the better shot feeling is obtained.

The center hardness of the core is preferably 20 or larger, more preferably 22 or larger, and even more preferably 24 or larger in Shore D hardness. If the center hardness is less than 20 in shore D hardness, the core becomes so soft that the resilience of the golf ball tends to become lower. Further, the center hardness of the core is preferably 50 or smaller, more preferably 48 or smaller, and even more preferably 46 or smaller in Shore D hardness. If the center hardness is more than 50 in shore D hardness, the core becomes too hard, resulting in the poor shot feeling. In the present invention, the center hardness of the core is the hardness measured with the Shore D type spring hardness tester at the central point of a cut plane of a core which has been cut into two halves.

The core preferably contains a filler. The filler is mainly blended as a weight adjusting agent in order to adjust density of the golf ball as the final product within the range of 1.0 to 1.5 g/cm$^3$, and may be blended as required. Examples of the filler include an inorganic filler such as zinc oxide, barium sulfate, calcium carbonate, magnesium oxide, tungsten powder, and molybdenum powder. The amount of the filler to be blended in the resin composition is preferably 0.5 part or more, more preferably 1.0 part or more, and is preferably 30 parts or less, more preferably 20 parts or less based on 100 parts of the resin component by mass. If the amount of the filler to be blended is less than 0.5 part by mass, it becomes difficult to adjust the weight, while if it is more than 30 parts by mass, the weight ratio of the resin component becomes small and the resilience tends to be lowered.

The cover of the golf ball of the present invention is preferably formed from a cover composition containing a resin component. The resin component includes, for example, various resins such as an ionomer resin, polyester resin, urethane resins such as a thermoplastic urethane resin or two-component curable urethane resin, polyamide resin or the like; and a thermoplastic polyamide elastomer having a commercial name of "Pebax (registered trademark) (e.g. "Pebax 2533")" commercially available from Arkema K. K.; a thermoplastic polyester elastomer having a commercial name of "Hytrel (registered trademark) (e.g. "Hytrel 3548", "Hytrel 4047")" commercially available from Du Pont-Toray Co., Ltd.; a thermoplastic polyurethane elastomer having a commercial name of "Elastollan (registered trademark) (e.g. "Elastollan XNY97A")" commercially available from BASF Japan Ltd.; a thermoplastic styrene elastomer having a commercial name of "Rabalon (registered trademark)" commercially available from Mitsubishi Chemical Corporation. These resin components are used solely or as a mixture of at least two of them.

The ionomer resin preferably includes the resins exemplified as (a-2) or (a-4) components.

The cover composition which constitutes the golf ball cover preferably contains the polyurethane resin (including polyurethane elastomer) or the ionomer resin, as the resin component. The content of the polyurethane resin or the ionomer resin in the resin component of the cover composition is preferably 50 mass % or more, more preferably 60 mass % or more, even more preferably 70 mass % or more.

In the present invention, in addition to the aforementioned resin component, the cover composition may further contain a pigment component such as a white pigment (for example, titanium oxide), a blue pigment, a red pigment, or the like; a weight adjusting agent such as zinc oxide, calcium carbonate, barium sulfate, or the like; a dispersant; an antioxidant; an ultraviolet absorber; a light stabilizer; a fluorescent material; a fluorescent brightener; or the like, as long as they do not impair the performance of the cover.

The amount of the white pigment (for example, titanium oxide), with respect to 100 parts by mass of the resin component constituting the cover, is preferably 0.5 part by mass or more, more preferably 1 part by mass or more, and is preferably 10 parts by mass or less, more preferably 8 parts by mass or less. If the amount of the white pigment is 0.5 part by mass or more, it is possible to impart the opacity to the cover. If the amount of the white pigment is more than 10 parts by mass, the durability of the resultant cover may deteriorate.

An embodiment for molding a cover is not particularly limited, and includes an embodiment which comprises injection molding the cover composition directly onto the core, or an embodiment which comprises molding the cover composition into a hollow-shell, covering the core with a plurality of the hollow-shells and subjecting the core with a plurality of the hollow shells to the compression-molding (preferably an embodiment which comprises molding the cover composition into a half hollow-shell, covering the core with the two half hollow-shells, and subjecting the core with the two half hollow-shells to the compression-molding).

In the case of directly injection molding the cover composition, the cover composition extruded in the pellet form beforehand may be used for injection molding or the materials such as the resin components and the pigment may be dry blended, followed by directly injection molding the blended material. It is preferred to use upper and lower molds having a spherical cavity and pimples for forming a cover, wherein a part of the pimples also serves as a retractable hold pin. When molding the cover by injection molding, the hold pin is protruded to hold the core, and the cover composition which has been heated and melted is charged and then cooled to obtain a cover. For example, it is preferred that the cover composition heated and melted at the temperature ranging from 200° C. to 250° C. is charged into a mold held under the pressure of 9 MPa to 15 MPa for 0.5 second to 5 seconds, and after cooling for 10 to 60 seconds, the mold is opened and the golf ball with the cover molded is taken out from the mold.

When molding a cover, the concave portions called "dimple" are usually formed on the surface. The total number of the dimples is preferably 200 or more and 500 or less. If the total number is less than 200, the dimple effect is hardly obtained. On the other hand, if the total number exceeds 500, the dimple effect is hardly obtained because the size of the respective dimples is small. The shape (shape in a plan view) of dimples includes, for example, without limitation, a circle, polygonal shapes such as roughly triangular shape, roughly quadrangular shape, roughly pentagonal shape, roughly hexagonal shape, and another irregular shape. The shape of the dimples is employed solely or in combination at least two of them.

In the present invention, the thickness of the cover of the golf ball is preferably 2.0 mm or less, more preferably 1.6 mm or less, even more preferably 1.2 mm or less, most preferably 1.0 mm or less. If the thickness of the cover is 2.0 mm or less, the resilience and shot feeling of the obtained golf ball become better. The thickness of the cover is preferably 0.1 mm or more, more preferably 0.2 mm or more, and even more preferably 0.3 mm or more. If the thickness of the cover is less than 0.1 mm, it may become difficult to mold the cover. In addition, the durability and the wear resistance of the cover may deteriorate.

After the cover is molded, the mold is opened and the golf ball body is taken out from the mold, and as necessary, the golf ball body is preferably subjected to surface treatments such as deburring, cleaning, and sandblast. If desired, a paint film or a mark may be formed. The paint film preferably has a thickness of, but not limited to, 5 μm or larger, and more preferably 7 μm or larger, and preferably has a thickness of 25 μm or smaller, and more preferably 18 μm or smaller. If the thickness is smaller than 5 μm, the paint film is easy to wear off due to continued use of the golf ball, and if the thickness is larger than 25 μm, the effect of the dimples is reduced, resulting in lowering flying performance of the golf ball.

When the golf ball of the present invention has a diameter in a range from 40 mm to 45 mm, a compression deformation amount of the golf ball (shrinking amount of the golf ball in the compression direction thereof) when applying a load from an initial load of 98 N to a final load of 1275 N to the golf ball is preferably 2.0 mm or more, more preferably 2.2 mm or more, and is preferably 4.0 mm or less, more preferably 3.5 mm or less. If the compression deformation amount is 2.0 mm or more, the golf ball does not become excessively hard, and thus exhibits the good shot feeling. On the other hand, if the compression deformation amount is 4.0 mm or less, the resilience is enhanced.

The present invention is explained based on the embodiment where the golf ball resin composition of the present invention is used for the core, but the golf ball resin composition of the present invention may be used as the center, the intermediate layers, and the cover. If the center is formed from the golf ball resin composition of the present invention, the intermediate layers may be formed from the resin components exemplified as the cover materials.

EXAMPLES

Hereinafter, the present invention will be described in detail by way of example. The present invention is not limited to examples described below. Various changes and modifications can be made without departing from the spirit and scope of the present invention.

[Evaluation Methods]
(1) Slab Hardness (Shore D Hardness)

Sheets with a thickness of about 2 mm were produced by hot press molding the golf ball resin composition, and stored at 23° C. for two weeks. Three or more of these sheets were stacked on one another so as not to be affected by the measuring substrate on which the sheets were placed, and the hardness of the stack was measured with a type P1 auto loading durometer manufactured by Kobunshi Keiki Co., Ltd., provided with a Shore D type spring hardness tester prescribed in ASTM-D2240.

(2) Melt Flow Rate (MFR) (g/10 min)

The MFR was measured using a flow tester (Shimadzu flow tester CFT-100C manufactured by Shimadzu Corporation) in accordance with JIS K7210. The measurement was conducted under the conditions of the measurement temperature 190° C. and the load of 2.16 kg.

(3) Rebound Resilience (%)

A sheet with a thickness of about 2 mm was produced by a hot press molding the golf ball resin composition. A circle-shaped test piece having a diameter of 28 mm was cut out of this sheet, and 6 pieces of the test piece were stacked to prepare a cylindrical test piece having a thickness of about 12 mm and a diameter of 28 mm. The cylindrical test piece was subjected to the Lupke type rebound resilience test (testing temperature 23° C., humidity 50 RH %). Preparation of the test piece and the testing method are based on JIS K6255.

(4) Compression Deformation Amount (mm)

A compression deformation amount of the spherical body (a shrinking amount of the spherical body in the compression direction thereof), when applying a load from 98 N as an initial load to 1275 N as a final load to the spherical body, was measured. The compression deformation amount of spherical body No. 5 was defined as an index of 1.00, and the compression deformation amounts of the other spherical bodies were represented by converting the compression deformation amounts of the spherical bodies into this index.

(5) Coefficient of Restitution

A 198.4 g of metal cylindrical object was forced to collide with each spherical body at a speed of 40 m/sec, and the speeds of the cylindrical object and the spherical body before and after the collision were measured. Based on these speeds and the mass of each object, coefficient of restitution for each spherical body was calculated. The measurement was conducted by using twelve spherical bodies for each spherical body, and the average value was regarded as the coefficient of restitution for the spherical body.

(6) Shot Feeling

An actual hitting test was carried out by ten amateur golfers (high skilled person) using a driver. Feeling at the shot was evaluated by each person according to the following criteria. Major result of the evaluations of ten golfers was employed as the result of the golf ball.

E (Excellent): Impact is small and feeling is good.
G (Good): Normal feeling.
P (Poor): Impact is large and feeling is poor.

(7) Method for Measuring the Spin-lattice Relaxation Time (T1) of $^{13}C$ Nucleus Measured by a High Resolution Solid State Carbon Nuclear Magnetic Resonance (NMR) Method Apparatus: Bruker Avance 400
Measuring method: Measurement of the relaxation time (T1) by Torcha method
Measurement frequency: 100.6256207 MHz
Measurement temperature: room temperature
Reference material: adamantane
Number of revolutions of magic angle revolution: 5000 Hz
Pulse width: 4.80 micro sec.
Contact time: 2000 micro sec.
Pulse interval: 1 micro sec., 100 m sec., 500 m sec., 1 sec., 2 sec., 3 sec., 4 sec., 6 sec., 8 sec., 10 sec., 12 sec., 15 sec., 20 sec., 40 sec., 80 sec., 120 sec.
Magnetic field intensity: 9.4 T

[Production of the Spherical Body (Core)]

As shown in Tables 1 to 3, the blending materials were dry blended, followed by mixing with a twin-screw kneading extruder to extrude the blended material in the strand form into the cool water. The extruded strand was cut with a pelletizer to prepare a golf ball resin composition in the form of pellet. Extrusion was performed in the following conditions: screw diameter=45 mm; screw revolutions=200 rpm; and screw L/D=35. The mixtures were heated to a temperature in a range from 160° C. to 230° C. at a die position of the extruder. The obtained golf ball resin composition in the form of pellet was injection molded at a temperature of 220° C. to prepare a spherical body (core) having a diameter of 40 mm.

TABLE 1

| | | Spherical body No. | | | | | | | | | |
|---|---|---|---|---|---|---|---|---|---|---|---|
| | | 1 | 2 | 3 | 4 | 5 | 6 | 7 | 8 | 9 | 10 |
| Golf ball resin composition | NUCREL AN4319 | 100 | 100 | — | — | — | — | — | 100 | 100 | 100 |
| | NUCREL N1560 | — | — | — | — | — | — | — | — | — | — |
| | Surlyn 6320 | — | — | 100 | 100 | 100 | 100 | 100 | — | — | — |
| | Basic magnesium oleate (metal content: 1.8 mole %) | 41.21 | 61.82 | 25.70 | 33.10 | 70.20 | 89.80 | 99.80 | — | — | — |
| | Magnesium oleate | — | — | — | — | — | — | — | — | — | — |
| | Magnesium behenate | — | — | — | — | — | — | — | — | — | — |
| | Oleic acid | 28.21 | 8.26 | — | — | — | — | — | — | — | — |
| | Magnesium hydrate | — | — | — | — | — | — | — | 0.54 | 1.08 | 1.63 |
| Properties | Melt flow rate (g/10 min) | 22 or more | 22 or more | 3.12 | 8.02 | 16.22 | 15.44 | 22 or more | 22 or more | 22 or more | 8.95 |
| | Shore D hardness | 43 | 48 | 50 | 51 | 49 | 48 | 47 | 34 | 37 | 40 |
| | Rebound resilience (%) | 65 | 73 | 67 | 69 | 75 | 76 | 77 | 42 | 47 | 50 |
| | Relaxation time (T1) (sec.) | 5.56 | 4.38 | 5.21 | 4.90 | 4.15 | 4.05 | 3.95 | 21.19 | 14.63 | 11.15 |
| | Compression deformation amount (index) | 1.38 | 1.05 | 0.95 | 0.91 | 1.00 | 1.05 | 1.11 | 2.74 | 2.25 | 1.80 |
| | Coefficient of Restitution | 0.821 | 0.903 | 0.842 | 0.862 | 0.924 | 0.934 | 0.945 | 0.501 | 0.594 | 0.638 |
| | Shot feeling | E | E | E | E | E | E | E | E | E | E |

Formulation: parts by mass

TABLE 2

| | | Spherical body No. | | | | | | |
|---|---|---|---|---|---|---|---|---|
| | | 11 | 12 | 13 | 14 | 15 | 16 | 17 |
| Golf ball resin composition | NUCREL AN4319 | — | — | — | 100 | 100 | — | — |
| | NUCREL N1560 | 100 | 100 | 100 | — | — | 100 | 100 |
| | Surlyn 6320 | — | — | — | — | — | — | — |
| | Basic magnesium oleate (metal content: 1.8 mole %) | — | — | — | — | 20.61 | 20.0 | 120.0 |
| | Oleic acid | — | — | — | 68.11 | 48.16 | — | — |
| | Magnesium hydrate | — | 2.03 | 3.05 | — | — | — | — |
| Properties | Melt flow rate (g/10 min) | 22 or more | 7.19 | 3.40 | 22 or more | 22 or more | 2.11 | 22 or more |
| | Shore D hardness | 53 | 63 | 63 | 30 | 30 | 48 | 48 |
| | Rebound resilience (%) | 37 | 55 | 56 | 26 | 55 | 60 | 60 |
| | Relaxation time (T1) (sec.) | 95.92 | 7.21 | 7.95 | 150.34 | 8.42 | 6.70 | 6.70 |
| | Compression deformation amount (index) | 0.81 | 0.57 | 0.64 | 3.33 | 3.33 | 1.05 | 1.05 |
| | Coefficient of Restitution | 0.554 | 0.755 | 0.758 | 0.419 | 0.718 | 0.769 | 0.769 |
| | Shot feeling | G | P | P | E | E | E | E |

Formulation: parts by mass

TABLE 3

| | | Spherical body No. | | | | | | |
|---|---|---|---|---|---|---|---|---|
| | | 18 | 19 | 20 | 21 | 22 | 23 | 24 |
| Golf ball resin composition Properties | Surlyn 6320 | 100 | 100 | 100 | 100 | 100 | 100 | 100 |
| | Magnesium behenate | 20.00 | 20.57 | 33.10 | 70.20 | 89.80 | 99.80 | 120.00 |
| | Melt flow rate (g/10 min) | 1.32 | 2.93 | 7.06 | 15.37 | 14.23 | 22 or more | 22 or more |
| | Shore D hardness | 46 | 49 | 53 | 54 | 55 | 56 | 58 |
| | Rebound resilience (%) | 50 | 58 | 60 | 61 | 62 | 63 | 51 |
| | Relaxation time (T1) | 11.11 | 7.30 | 6.73 | 6.41 | 6.10 | 5.95 | 10.96 |
| | Compression deformation amount (index) | 1.17 | 1.00 | 0.82 | 0.79 | 0.75 | 0.72 | 0.66 |
| | Coefficient of Restitution | 0.669 | 0.749 | 0.768 | 0.781 | 0.794 | 0.801 | 0.672 |
| | Shot feeling | E | E | E | E | E | E | G |

Formulation: parts by mass

The materials used in Tables 1 to 3 are follows.
"Surlyn 6320": Magnesium ion neutralized ethylene-methacrylic acid-butyl acrylate ternary copolymer ionomer resin (melt flow rate (190° C., 2.16 kg): 1.0 g/10 min) available from E.I. du Pont de Nemours and Company
"NUCREL AN4319": Ethylene-methacrylic acid-butyl acrylate ternary copolymer (melt flow rate 190° C., 2.16 kg): 55 g/10 min, bending stiffness: 21 MPa) available from Du Pont-Mitsui Polychemicals Co., Ltd.
"NUCREL N1560": Ethylene-methacrylic acid copolymer (melt flow rate (190° C., 2.16 kg): 60 g/10 min, shore D hardness: 53, bending stiffness: 83 MPa) available from Du Pont-Mitsui Polychemicals Co., Ltd.
Basic magnesium oleate: (metal content: 1.8 mole %, $M^1=M^2=Mg$, R=17 carbon atoms in formula (1)) available from Nitto Kasei Kogyo K.K.
Magnesium oleate: Nitto Kasei Kogyo K.K.
Oleic acid: Wako Pure Chemical Industries, Ltd.
Magnesium behenate: Wako Pure Chemical Industries, Ltd.
Magnesium hydroxide: Wako Pure Chemical Industries, Ltd.

As is apparent from Tables 1 to 3, the golf ball resin composition comprising (A) at least one resin component selected from the group consisting of (a-1) a binary copolymer composed of an olefin and an α,β-unsaturated carboxylic acid having 3 to 8 carbon atoms, (a-2) an ionomer resin consisting of a metal ion-neutralized product of a binary copolymer composed of an olefin and an α,β-unsaturated carboxylic acid having 3 to 8 carbon atoms, (a-3) a ternary copolymer composed of an olefin, an α,β-unsaturated carboxylic acid having 3 to 8 carbon atoms and an α,β-unsaturated carboxylic acid ester, and (a-4) an ionomer resin consisting of a metal ion-neutralized product of a ternary copolymer composed of an olefin, an α,β-unsaturated carboxylic acid having 3 to 8 carbon atoms and an α,β-unsaturated carboxylic acid ester; and (B) a basic metal salt of a fatty acid, and having a spin-lattice relaxation time (T1) of $^{13}C$ nucleus measured by a high resolution solid state nuclear magnetic resonance (NMR) method of 5.56 seconds or shorter has high resilience and is capable of injection molding and recycling. In addition, the golf balls formed from the golf ball rein composition have a better shot feeling, respectively.

Comparing golf balls No. 3 to No. 7 with golf balls No. 18 to No. 24, the resilience of golf ball No. 24 deteriorates when the number of moles of Mg is 0.17 mole with respect to 100 parts by mass of the resin component, whereas the resilience of golf ball No. 7 further enhances even when the number of moles of Mg is 0.33 mole with respect to 100 parts by mass of the resin component. From this result, the basic metal salt of the fatty acid used in the present invention, compared to a mere metal salt of a fatty acid, has high neutralizing ability and high resilience-enhancing effect to the obtained golf ball resin composition.

FIG. 1 is a graph showing a correlation between the coefficient of restitution and the relaxation time (T1). It notes that the coefficient of restitution became larger as the relaxation time became shorter. In particular, if the relaxation time is 5.56 seconds or shorter, the core having the coefficient of restitution of 0.821 or more is obtained.

According to the present invention, the golf ball with the excellent resilience and shot feeling is obtained. This application is based on Japanese Patent application No. 2011-289984 filed on Dec. 28, 2011, the contents of which are hereby incorporated by reference.

What is claimed is:

1. A golf ball resin composition comprising:
(A) at least one resin component selected from the group consisting of
(a-1) a binary copolymer composed of an olefin and an α, β-unsaturated carboxylic acid having 3 to 8 carbon atoms,
(a-2) an ionomer resin consisting of a metal ion-neutralized product of a binary copolymer composed of an olefin and an α,β-unsaturated carboxylic acid having 3 to 8carbon atoms,
(a-3) a ternary copolymer composed of an olefin, an α,β-unsaturated carboxylic acid having 3 to 8 carbon atoms and an α,β-unsaturated carboxylic acid ester, and
(a-4) an ionomer resin consisting of a metal ion-neutralized product of a ternary copolymer composed of an olefin, an α,β-unsaturated carboxylic acid having 3 to 8 carbon atoms and an α,β-unsaturated carboxylic acid ester; and
(B) a basic metal salt of a fatty acid, and having a spin-lattice relaxation time (T1) of $^{13}C$ nucleus measured by a high resolution solid state nuclear magnetic resonance (NMR) method of 5.56 seconds or shorter,
wherein (B) the basic metal salt of the fatty acid is present in an amount range of from 25 parts to 100 parts by mass with respect to 100 parts by mass of (A) the resin component, and
wherein the basic metal salt of the fatty acid is represented by the following general formula (1):

$$mM^1O.M^2(RCOO)_2 \quad (1)$$

wherein m ranges from 0.8 to 2.0, RCOO represents a residue of the fatty acid, and $M^1$ and $M^2$ are magnesium, respectively.

2. The golf ball resin composition according to claim 1, wherein (B) the basic metal salt of the fatty acid is a basic metal salt of a fatty acid having 8 to 30 carbon atoms.

3. The golf ball resin composition according to claim 2, wherein (B) the basic metal salt of the fatty acid is a basic metal salt of an unsaturated fatty acid.

4. The golf ball resin composition according to claim 3, wherein the unsaturated fatty acid component of (B) the basic metal salt of the fatty acid is at least one component selected from the group consisting of oleic acid, erucic acid, linoleic acid, linolenic acid, arachidonic acid, eicosapentaenoic acid, docosahexaenoic acid, stearidonic acid, nervonic acid, vaccenic acid, gadoleic acid, elaidic acid, eicosenoic acid, eicosadienoic acid, docosadienoic acid, pinolenic acid, eleostearic acid, mead acid, adrenic acid, clupanodonic acid, nishinic acid, and tetracosapentaenoic acid.

5. The golf ball resin composition according to claim 1, wherein the golf ball resin composition has a slab hardness in a range from 20 to 65 in Shore D hardness.

6. The golf ball resin composition according to claim 1, wherein the golf ball resin composition has a melt flow rate (190° C., 2.16 kg) in a range from 0.01 g/10 min to 100 g/10 min.

7. The golf ball resin composition according to claim 1, wherein the golf ball resin composition has a rebound resilience of 40% or more.

8. The golf ball resin composition according to claim 1, wherein (B) the basic metal salt of the fatty acid is present in an amount range of from 25 parts to 70.2 parts by mass with respect to 100 parts by mass of (A) the resin component.

9. A golf ball comprising a core composed of at least one layer and a cover covering the core, wherein at least one layer of the core is formed from a golf ball resin composition comprising:
(A) at least one resin component selected from the group consisting of (a-1) a binary copolymer composed of an olefin and an α,β-unsaturated carboxylic acid having 3 to 8 carbon atoms,
(a-2) an ionomer resin consisting of a metal ion-neutralized product of a binary copolymer composed of an olefin and an α,β-unsaturated carboxylic acid having 3 to 8 carbon atoms,
(a-3) a ternary copolymer composed of an olefin, an α,β-unsaturated carboxylic acid having 3 to 8 carbon atoms and an α,β-unsaturated carboxylic acid ester, and
(a-4) an ionomer resin consisting of a metal ion-neutralized product of a ternary copolymer composed of an olefin, an α,β-unsaturated carboxylic acid having 3 to 8 carbon atoms and an α,β-unsaturated carboxylic acid ester; and
(B) a basic metal salt of a fatty acid, and having a spin-lattice relaxation time (T1) of $^{13}C$ nucleus measured by a high resolution solid state nuclear magnetic resonance (NMR) method of 5.56 seconds or shorter,
wherein (B) the basic metal salt of the fatty acid is present in an amount range of from 25 parts to 100 parts by mass with respect to 100 parts by mass of (A) the resin component, and
wherein the basic metal salt of the fatty acid is represented by the following general formula (1):

$$mM^1O\cdot M^2(RCOO)_2 \tag{1}$$

wherein m ranges from 0.8 to 2.0, RCOO represents a residue of the fatty acid, and $M^1$ and $M^2$ are magnesium, respectively.

10. The golf ball according to claim 9, wherein (B) the basic metal salt of the fatty acid is a basic metal salt of a fatty acid having 8 to 30 carbon atoms.

11. The golf ball according to claim 9, wherein (B) the basic metal salt of the fatty acid is a basic metal salt of an unsaturated fatty acid.

12. The golf ball according to claim 11, wherein the unsaturated fatty acid component of (B) the basic metal salt of the fatty acid is at least one component selected from the group consisting of oleic acid, erucic acid, linoleic acid, linolenic acid, arachidonic acid, eicosapentaenoic acid, docosahexaenoic acid, stearidonic acid, nervonic acid, vaccenic acid, gadoleic acid, elaidic acid, eicosenoic acid, eicosadienoic acid, docosadienoic acid, pinolenic acid, eleostearic acid, mead acid, adrenic acid, clupanodonic acid, nishinic acid, and tetracosapentaenoic acid.

13. The golf ball according to claim 9, wherein the golf ball resin composition has a slab hardness in a range from 20 to 65 in Shore D hardness, a melt flow rate (190° C., 2.16 kg) in a range from 0.01 g/10 min to 100 g/10 min, and a rebound resilience of 40% or more.

14. The golf ball according to claim 9, wherein (B) the basic metal salt of the fatty acid is present in an amount range of from 25 parts to 70.2 parts by mass with respect to 100 parts by mass of (A) the resin component.

15. A one-piece golf ball comprising a golf ball body formed from a golf ball resin composition, wherein the golf ball resin composition comprises:

(A) at least one resin component selected from the group consisting of
(a-1) a binary copolymer composed of an olefin and an α,β-unsaturated carboxylic acid having 3 to 8 carbon atoms,
(a-2) an ionomer resin consisting of a metal ion-neutralized product of a binary copolymer composed of an olefin and an α,β-unsaturated carboxylic acid having 3 to 8 carbon atoms,
(a-3) a ternary copolymer composed of an olefin, an α,β-unsaturated carboxylic acid having 3 to 8 carbon atoms and an α,β-unsaturated carboxylic acid ester, and
(a-4) an ionomer resin consisting of a metal ion-neutralized product of a ternary copolymer composed of an olefin, an α,βunsaturated carboxylic acid having 3 to 8 carbon atoms and an α,β-unsaturated carboxylic acid ester; and
(B) a basic metal salt of a fatty acid, and has a spin-lattice relaxation time (T1) of $^{13}C$ nucleus measured by a high resolution solid state nuclear magnetic resonance (NMR) method of 5.56 seconds or shorter,
wherein (B) the basic metal salt of the fatty acid is present in an amount range of from 25 parts to 100 parts by mass with respect to 100 parts by mass of (A) the resin component, and
wherein the basic metal salt of the fatty acid is represented by the following general formula (1):

$$mM^1O\cdot M^2(RCOO)_2 \tag{1}$$

wherein m ranges from 0.8 to 2.0, RCOO represents a residue of the fatty acid, and $M^1$ and $M^2$ are magnesium, respectively.

16. The one-piece golf ball according to claim 15, wherein (B) the basic metal salt of the fatty acid is a basic metal salt of a fatty acid having 8 to 30 carbon atoms.

17. The one-piece golf ball according to claim 15, wherein (B) the basic metal salt of the fatty acid is a basic metal salt of an unsaturated fatty acid.

18. The one-piece golf ball according to claim 17, wherein the unsaturated fatty acid component of (B) the basic metal salt of the fatty acid is at least one component selected from the group consisting of oleic acid, erucic acid, linoleic acid, linolenic acid, arachidonic acid, eicosapentaenoic acid, docosahexaenoic acid, stearidonic acid, nervonic acid, vaccenic acid, gadoleic acid, elaidic acid, eicosenoic acid, eicosadienoic acid, docosadienoic acid, pinolenic acid, eleostearic acid, mead acid, adrenic acid, clupanodonic acid, nishinic acid, and tetracosapentaenoic acid.

19. The one-piece golf ball according to claim 15, wherein the golf ball resin composition has a slab hardness in a range from 20 to 65 in Shore D hardness, a melt flow rate (190° C., 2.16 kg) in a range from 0.01 g/10 min to 100 g/10 min, and a rebound resilience of 40% or more.

20. The one-piece golf ball according to claim 15, wherein (B) the basic metal salt of the fatty acid is present in an amount range of from 25 parts to 70.2 parts by mass with respect to 100 parts by mass of (A) the resin component.

* * * * *